United States Patent
Liedtke et al.

[11] Patent Number: 6,163,292
[45] Date of Patent: Dec. 19, 2000

[54] METHOD OF DETERMINING THE ABILITY OF A MEDIUM TO ABSORB ELECTROMAGNETIC WAVES AND A SENSOR FOR DETECTING FOREIGN BODIES IN THE MEDIUM

[75] Inventors: Stefan Liedtke, Rankweil; Stefan Tichy, Vienna, both of Australia

[73] Assignee: Hilti Aktiengesellschaft, Schaan, Liechtenstein

[21] Appl. No.: 09/418,335

[22] Filed: Oct. 14, 1999

[30] Foreign Application Priority Data

Oct. 15, 1998 [DE] Germany .......................... 198 47 688
Apr. 1, 1999 [DE] Germany .......................... 199 15 016

[51] Int. Cl.$^7$ .............................. G01S 13/88; G01V 3/00
[52] U.S. Cl. .............................. 342/22; 342/27; 342/189; 342/192; 342/195; 342/196
[58] Field of Search ................................ 342/1, 2, 3, 4, 342/22, 165, 195, 27, 28, 189, 190–194, 196, 197

[56] References Cited

U.S. PATENT DOCUMENTS

| | | | |
|---|---|---|---|
| 4,901,080 | 2/1990 | McHenry | 342/1 |
| 5,428,360 | 6/1995 | Tam et al. | 342/165 |
| 5,910,787 | 6/1999 | Berg et al. | 342/165 |
| 5,936,568 | 8/1999 | Berg et al. | 342/1 |
| 6,008,753 | 12/1999 | Berg et al. | 342/165 |

*Primary Examiner*—Bernarr E. Gregory
*Attorney, Agent, or Firm*—Brown & Wood, LLP

[57] ABSTRACT

A method of determining the ability of a medium to absorb electromagnetic waves including placing antenna unit (10) having spaced transmitting and receiving antennas (2 and 3) on a limiting surface of a medium (13), emitting, with the transmitting antenna (2), a radar wave into the medium (13) which is detected as a cross-signal by the receiving antenna (3), pre-processing and digitalizing the cross-signal, and, thereafter, analyzing the cross-signal with an algorithm for determining the ability of the medium to absorb electromagnetic waves and, thereby, a type of the medium; and an electromagnetic sensor the operation of which is based on the method.

6 Claims, 4 Drawing Sheets

METHOD OF DETERMINING THE ABILITY OF A MEDIUM TO ABSORB ELECTROMAGNETIC WAVES AND A SENSOR FOR DETECTING FOREIGN BODIES IN THE MEDIUM

BACKGROUND OF THE INVENTION

1. Field of the Invention

The present invention relates to a method of determining the ability of a particular medium to absorb electromagnetic waves. The present invention also relates to an electromagnetic sensor for detecting foreign bodies in media circumscribed by limiting surfaces, such as concrete, breakwork, gypsum or wood, and which includes a transceiver unit to be positioned on a limiting surface of a medium, the transmitting antenna of which emits radar waves.

2. Description of the Prior Act

Radar apparatuses, in particular ground radars or GPR-systems (GPR-ground penetrating radar) are used in geodesic works for a long time. These apparatuses continuously emit electromagnetic waves necessary for effecting measurements as soon as the apparatus is actuated. If an emission power of, e.g., an impulse radar is insufficient for a particular examination of a material, the operator can, at his discretion, increase the emission power within predetermined limits. However, from the safety point of view, it is desirable to obtain, before the measurement proper, for a precise examination of a medium, in particular for tracking down the foreign bodies located inside the medium, an information of what type of an electromagnetic wave-absorbing material is located beneath a surface or a section of a surface subjected to examination by the electromagnetic sensor.

In addition to this prime object, there exists another safety-relevant aspect, namely, the emission power, which is emitted by a transmitting antenna, should not be released without a preliminary assessment of the absorption ability of the examined medium. Naturally, the most obvious solution was to integrate a touch switch into the transmitting antenna or in the antenna or transceiver unit. This touch switch could register the moment of placement of the antenna unit onto a limiting surface but could not recognize whether the material absorbs the emitted emission. In this way, upon the presence of, e.g., cavities, a radar pulse of a too big power would be emitted which, of course, is undesirable from the safety point of view.

Accordingly, the object of the present invention is to provide a method and an apparatus for, e.g., a GPR-system and, in particular for an electromagnetic sensor for examination of media circumscribed by limiting surfaces, such as concrete, gypsum, breakwork and the like, which would permit, at least roughly, to analyze the ability of the corresponding medium to absorb an electromagnetic emission before emitting a radar wave, the power of which is then can be correctly chosen, in an actual measurement process.

SUMMARY OF THE INVENTION

This and other objects of the present invention, which will become apparent hereinafter, are achieved by providing a method of determining a ability of a medium to absorb electromagnetic waves which includes emitting, with the transmitting antenna, a radar wave into the medium, which is detected as a a signal that crosses the medium (cross-signal) by the receiving antenna, preprocessing and digitalizing the cross-signal, and, thereafter, analyzing the cross-signal with an algorithm for determining the capacity of the medium to absorb electromagnetic waves, whereby a type of the medium is determined.

The method according to the present invention differs from a comparable method described in the literature (see I. J. Padaratz et al., Coupling Effect of Radar Antenna on Concrete, documents of a conference "Non-destructive Testing in Civil Engineering," NDT-CE '97, Volume I, pp. 237–245) in that the measurement is effected not through the medium but rather in the surface region adjacent to the outer surface of the medium subjected shortly thereafter or practically concurrently to an operational process, e.g., with the use of a hammer drill. Thus, there is no need in processing, as in known method of determining an absorption ability, of separate sample of a medium (concrete), and in an expensive radar measuring apparatus.

An algorithm, which is used for signal analysis for the determination of the absorption ability of a medium and for the determination of permittivity, can be based on different principles. E.g., it can be based on the determination, in the course of propagation of the signal, after appropriate corrected amplification and low-pass filtration, of at least one amplitude maximum of the cross-signal and at least one amplitude minimum of the cross-signal, with subsequent determination of respective ratios of the at least one amplitude maximum and the at least one amplitude minimum to respective associated reference maximum and minimum, whereby the type of the medium is determined.

The analysis, i.e., the algorithm can be also based on the determination, in course of propagation of the cross-signal, of a time difference between at least one of two maxima and two minima of the cross-signal, with subsequent comparison of the time difference with a corresponding time difference of a cross-signal through a known medium, whereby the type of the medium can also be determined.

The analysis leading to the determination of the type of examined medium can be based on the creation, based on a cross-signal in a predetermined time domain of an autoregressive model, with subsequent transformation of the digitalized signal in a z-plane, i.e., providing Fourier-Laplace transformed representation of the digital, discrete cross-signal and comparison, of a frequency value and/or an attenuation value of the cross-signal with a predetermined reference value. Preferably an autoregressive model of second order is used as evaluation algorithm. According to a further concept of the present invention, there is provided an electromagnetic sensor for determining presence of foreign bodies in a medium circumscribed by limiting surfaces and, in particular in concrete, breakwork, gypsum or wood.

The sensor includes an antenna unit including a transmitting antenna for emitting into the medium, after the antenna unit has been placed on a limiting surface of the medium, a radar wave of reduced power, and a receiving antenna for detecting a cross-signal generated by the radar wave, and means which, based on a capacity of the medium to absorb electromagnetic waves determined by pre-processing and digitalizing the cross-signal and subsequent analysis of the cross-signal with an algorithm, as described above, generates an actuation signal for actuating foreign body detecting means when the absorption ability exceeds a minimal absorption capacity of the medium, upon a greater power of the radar wave, and generates a status signal when the absorption ability is below the minimal absorption ability of the medium.

The advantage of the inventive sensor consists in that it permits to insure before beginning of the actual measurement that the emitted emission would indeed be absorbed in the examined medium. Thus, the actual working emission used in the examination process can be optimally adjusted with respect to its power so that the power of the radar pulse would correspond to the type of the examined medium.

The novel features of the present invention, which are considered as characteristic for the invention, are set forth in particular in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
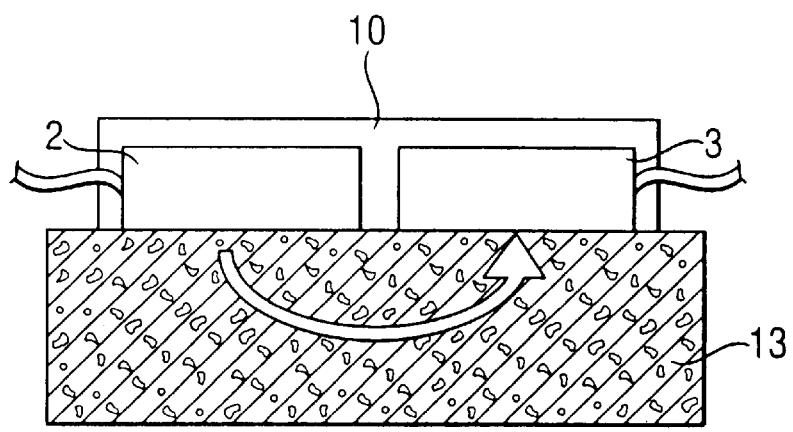
FIG. 1 a principle schema of a transceiver unit of a radar-based sensor for examination of media.

When sensors for an electromagnetic examination of media, such as GPR-sensors, which include a radar with separate transmitting and receiving antennas 2, enclosed in a transceiver unit 10, are used, upon the emission of waves in the microwave range, i.e., upon the emission of a radar pulse wave, a cross-signal, i.e. signal that crosses a media such as electro magnetic wave-absorbing medium 13, is transmitted from the transmitting antenna 2 to the receiving antenna 3, as shown in FIG. 1. According to the present invention, by using a targeted selective assessment and/or a predetermined signal processing algorithm, as it would be explained, by way of example, further below, this cross-signal can be used for obtaining information whether an electromagnetic wave-absorbing medium 13 is present beneath the antenna or transceiver unit 10.

Figure 2:
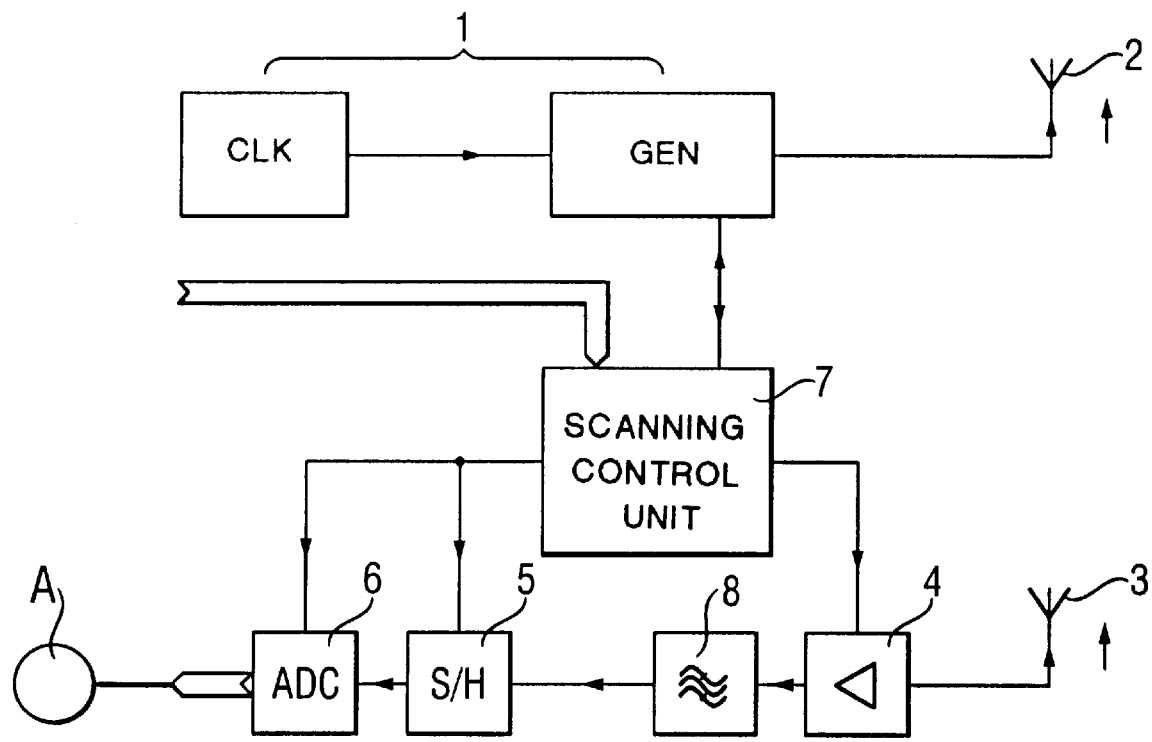
FIG. 2 a principle schema of a hardware of an impulse radar apparatus for detecting foreign bodies in media.

The functional principle of an impulse radar which, together with a stepped frequency radar, is of a primary interest here, can be explained with reference to FIG. 2. With a clock high-frequency generator 1, a very short pulse having a length or duration less than 1 ns is generated. This pulse is emitted by the antenna 2 as an electromagnetic wave into an examined medium (e.g., concrete). At the locations where the permittivity changes, e.g., in transition areas concrete/reinforcing metal, concrete/plastic pipe, the electromagnetic wave(s) is (are) reflected. This reflection is detected by the second antenna 3. The reflected signal is amplified by a high-frequency amplifier 4 which is controlled by a scanning control unit 7 in a time-dependent manner. The amplified signal is communicated to a band-limiting unit 8 and then to a scanning and holding circuit 5.

Finally, the signal is digitalized by an A/D converter 6 and communicated to signal processing means. The entire signal pre-processing equipment or at least the transmitting and receiving antennas 2 and 3 are located in a common housing unit 10 which can be easily handled.

As soon as the measurement begins, after the transceiver unit 10 has been placed on the limiting surface of the examined medium 13, the emission power of the transmitting antenna 2 is reduced by a certain amount in order to enable detection of the medium 13 located directly beneath the transceiver or antenna unit 10. With this reduced power, usually, a GPR-measurement is effected.

The cross-signal is received as a measurement signal by the receiving antenna 3. This signal is subsequently subjected to a time-dependent amplification in the high-frequency amplifier 4, and the data are subjected to a low-pass filtration.

Figure 4:
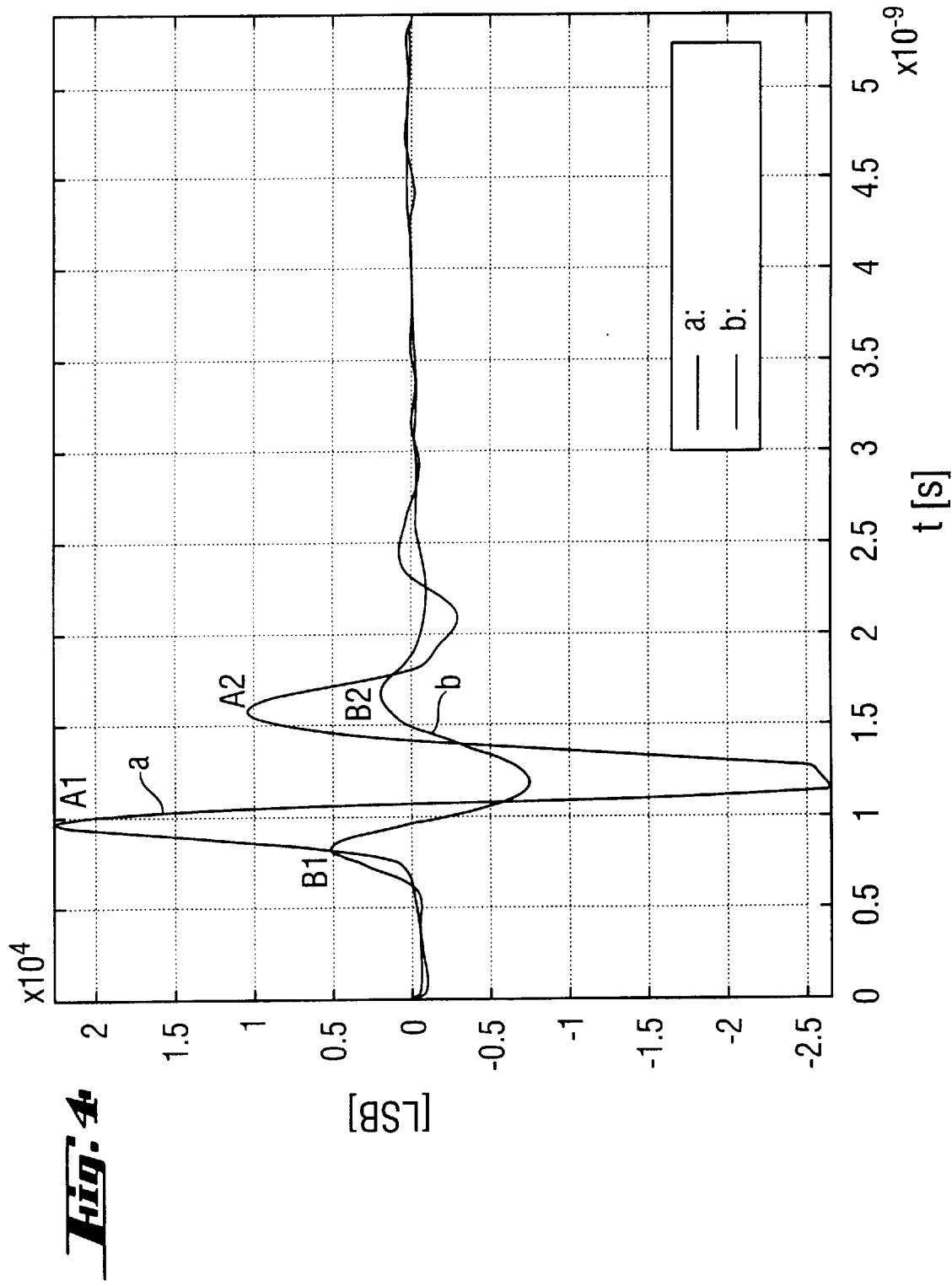
FIG. 4 a diagram for assessing the absorption ability of the examined medium.

FIG. 4 illustrates the measurement, which is based on a cross-signal containing measurement signal, in the air (curve a) for a non-absorbing medium and in concrete (curve b) for an absorbing medium. For the determination which type of medium is located beneath the antenna unit 10, by way of examples, which in no way limit the basic concept of the invention, three different methods, which will be described below, can be used.

Amplitude Ratio Method

In the signal of the curve b in FIG. 4, the signal strength in maxima B1, B2 is determined and is compared with the signal strength of maxima A1, A2 of the reference amplitudes of the curve a, which represents the measurement in a non-absorbing medium (air). The reference maxima can, e.g., be retrieved from a look-up table. The type of the examined medium can be determined from the ratios B1/A1 and B2/A2.

Time Difference Method

From the signal courses in FIG. 4, chronological positions of maxima B1, B2 are determined. The time difference $\Delta t_1 = t(B2) - t(B1)$ is compared with a time difference $\Delta t_r = t(A2) - t(A1)$ which, as a rule, is stored. The type of the examined medium is determined based on the comparison results.

Autoregressive (AR-) model

Based on the digitalized cross-signal in a time domain, an autoregressive model (AR-model) of a predetermined, preferably, lower, e.g., second order $$H(z) = \frac{1}{A(z)} = \frac{1}{1 + \sum_{v=1}^{n} \alpha_v \cdot z^{-v}} \quad (1)$$

is created. The created model forms part of a method of a parametric spectral evaluation and permits to determine the type of the analyzed medium. The calculated, by a special program, coefficients α are transformed, by using the equation (1), into conjugated complex poles of the function H(z) in the z-plane, which provides a transformed representation of the digital signal. These poles are then reproduced in the s-plane $s = \sigma + j\omega$ as a Fourier- or Laplace- transformed representation of the analog signal. Therefrom, the frequency ω is obtained. The frequency ω depends on electrical characteristics of the examined medium.

Figure 5:
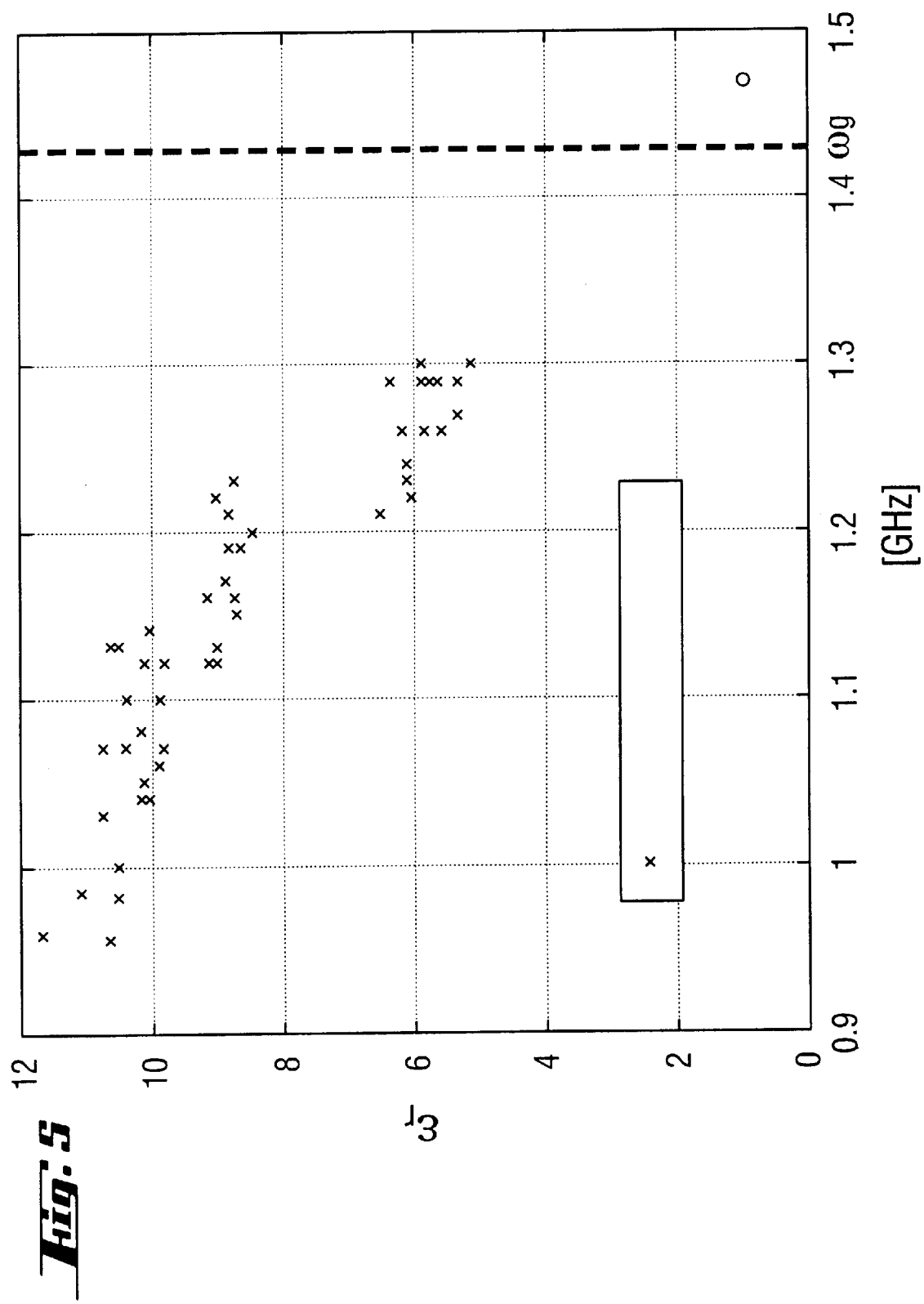
FIG. 5 a diagram illustrating the results of an evaluation of a signal analysis with the use of an autoregressive model of a cross-signal between the transmitting and receiving antennas of an electromagnetic sensor placed onto an examined medium.

The diagram of FIG. 5 shows frequencies ω, which are calculated, by using the AR-model, based on different measurements in an absorbing medium, concrete, on one hand, and in the air (non-absorbing medium), on the other hand. The frequencies ω are plotted on the absiss axis. Relative permittivities $\epsilon_r$ of these media are plotted on the ordinate axis. The critical frequency $\omega_g$ is clearly shown in the absorbing medium (x) and the non-absorbing medium (o). The values for the examined medium concrete (x) vary with respect to the frequency ω and the permittivity $\epsilon_r$ dependent on the composition of the concrete and, in particular, dependent on a respective water content.

Figure 3:
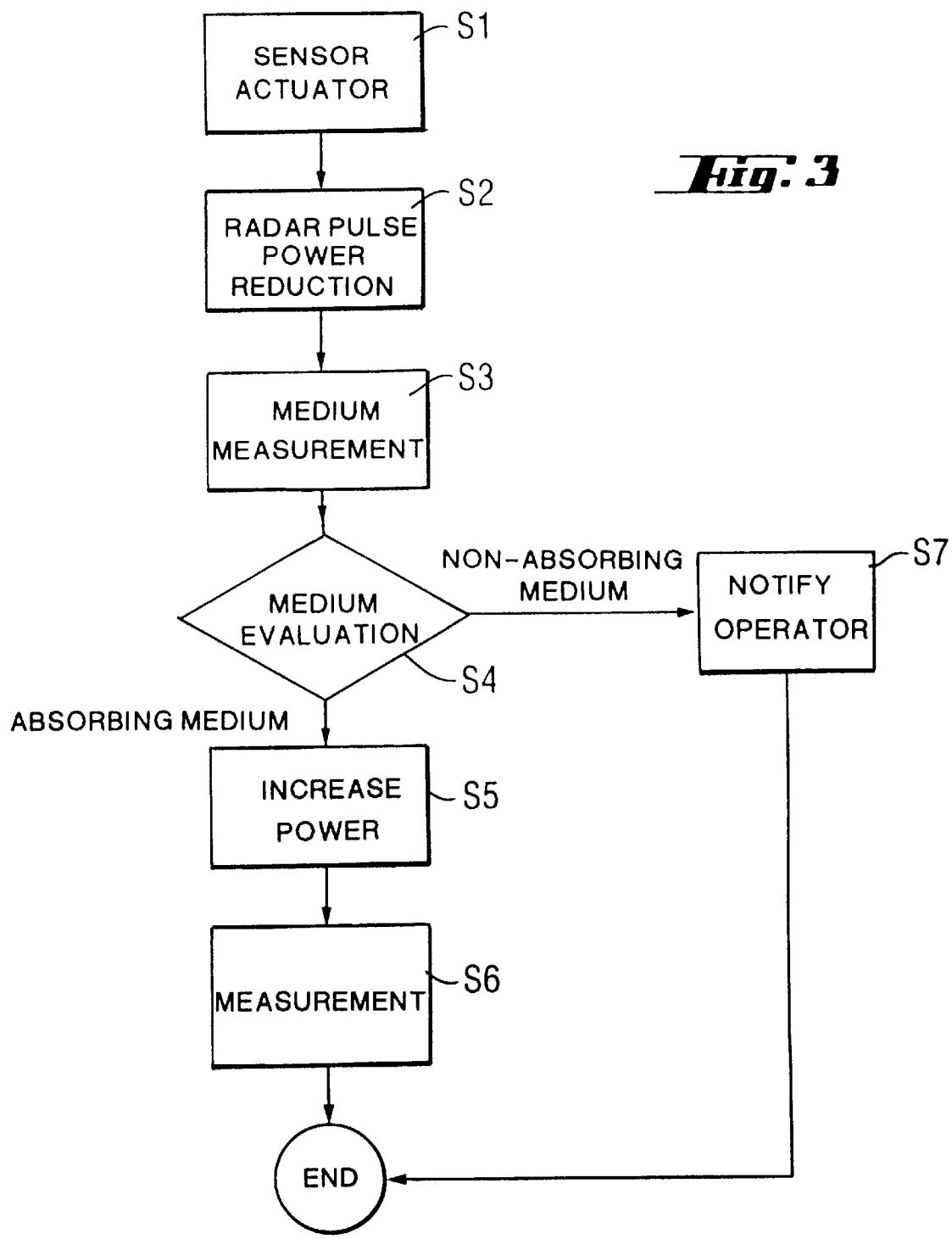
FIG. 3 a functional flow chart for operating an electromagnetic sensor, e.g., for detecting the presence of foreign bodies in media, on the basis of which, a determination of an absorption ability of the examined medium is made according to the present invention.

The flow chart of FIG. 3 illustrates the operational process of using an electromagnetic sensor based on the principle of the present invention, i.e., when before an actual measurement, e.g., for determining the type and the position of foreign bodies, such as reinforcing metal, pipes and the like in concrete or masonry, at least an approximate evaluation of the ability of an examined medium to absorb electromagnetic waves is made.

In step S1, the sensor is actuated only after the antenna unit 10 has been placed on a limiting surface of the examined medium and a safety switch which, preferably, cannot be influenced by an operator, has been activated. After the actuation of the sensor, in step S2, the power of a radar pulse, which is emitted by the transmitting antenna 2, is reduced to a degree which insures a reliable detection of the medium 13 located beneath the antenna unit 10. In step S3, the measurement is effected and in step S4, it is evaluated. In case the antenna unit 10 is located on an absorbing medium, the power of the radar wave(s) is correspondingly increased, preferably dependent on the medium type, in step S5. In step S6, one or several measurements can be conducted. The measurement and the evaluation include, in particular, the assessment of the depth at which a foreign body is located, which is based on the determination of the propagation of the reflecting signal from an equation.

$$V = \frac{c}{\sqrt{\varepsilon_r}}, \text{where-}$$

c—the velocity of light, and $\epsilon_r$—the earlier determined permittivity.

In case, when it is determined, in step S4, that the antenna unit 10 is placed on a non-absorbing medium, e.g., a cardboard wall, the operator would be accordingly notified in step S7, and the scanning process for the determination of the presence of the foreign body or bodies in the examined medium, which is described in U.S. patent application Ser. No. 09/414,193 incorporated by reference thereto, is then avoided.

Though the present invention has been shown and described with reference to a preferred embodiment, such is merely illustrative of the present invention and is not to be construed as a limitation thereof, and the present invention includes all modifications, variations and/or alternate embodiments within the spirit and scope of the present invention as defined by the appended claims.

What is claimed is:

1. A method of determining the ability of a medium to absorb electromagnetic waves, comprising the steps of providing an antenna unit having spaced transmitting and receiving antennas; placing the antenna unit on a limiting surface of the medium; emitting, with the transmitting antenna, a radar wave into the medium which is detected as a cross-signal by the receiving antenna; pre-processing and digitalizing the cross-signal; and, thereafter, analyzing the cross-signal with an algorithm for determining the ability of the medium to absorb electromagnetic waves and, thereby, a type of the medium.

2. A method according to claim 1, wherein the analyzing step includes determining, in course of propagation of the cross-signal, at least one amplitude maximum and at least one amplitude minimum of the cross-signal, and determining respective ratios of the at least one amplitude maximum and the at least one amplitude minimum to respective associated reference maximum and minimum, whereby the type of medium is determined.

3. A method according to claim 1, wherein the analyzing step includes determining, in course of propagation of the cross-signal, a time difference ($\Delta t_f$) between at least one of two maxima and two minima, and comparing the time difference ($\Delta t_f$) with a corresponding time difference ($\Delta t_r$) of a cross-signal through a known medium, whereby the type of the examined medium is determined.

4. A method according to claim 1, wherein the analyzing step includes the step of creating, based on a cross-signal in a predetermined time domain, of an autoregressive model for analytical determination of permittivity of the medium, the creating step including transformation of the digitalized signal in a z-plane, i.e., Fourier-Laplace transformed representation of the digital, discrete cross-signal and comparing at least one of a frequency value (ω) and an attenuation value (δ) of the cross-signal with a predetermined reference value.

5. A method according to claim 4, wherein the creating step includes creating of an autoregressive model of a second order which is used as an analyzing algorithm.

6. An electromagnetic sensor for determining presence of foreign bodies in a medium circumscribed by limiting surfaces and selected from a group consisting of concrete, breakwork, gypsum, and wood, the sensor comprising an antenna unit including a transmitting antenna for emitting into the medium, after the antenna unit has been placed on a limiting surface of the medium, a radar wave of reduced power, and a receiving antenna for detecting a cross-signal generated by the radar wave; and means which, based on the ability of the medium to absorb electromagnetic waves determined by pre-processing and digitalizing the cross-signal and, thereafter analyzing the cross-signal with an algorithm, generates an actuation signal for actuating a foreign body detecting means when the absorption ability exceeds a minimal absorption ability of the medium, upon a greater power of the radar wave, and generates a status signal when the absorption ability is below the minimal absorption ability of the medium.

* * * * *

UNITED STATES PATENT AND TRADEMARK OFFICE
CERTIFICATE OF CORRECTION

PATENT NO.    : 6,163,292

DATED         : December 19, 2000

INVENTOR(S)   : Stefan Liedtke, et al

It is certified that error appears in the above-identified patent and that said Letters Patent is hereby corrected as shown below:

```
On the title page:
```
{75} Inventors:

Stefan Liedtke, Rankweil; Stefan Tichy, Vienna, both AUSTRIA

Signed and Sealed this

First Day of May, 2001

Attest:

NICHOLAS P. GODICI

Attesting Officer

Acting Director of the United States Patent and Trademark Office